United States Patent
Mondino (10) Patent No.: US 9,999,794 B2
(45) Date of Patent: Jun. 19, 2018

(54) LOW ENVIRONMENTAL IMPACT REFRIGERANT GAS MIXTURES

(71) Applicant: Tazzetti S.P.A., Volpiano (IT)

(72) Inventor: Riccardo Mondino, La Loggia (IT)

(73) Assignee: Tazzetti S.P.A., Volpiano (Turin) (IT)

(*) Notice: Subject to any disclaimer, the term of this patent is extended or adjusted under 35 U.S.C. 154(b) by 53 days.

(21) Appl. No.: 14/651,763

(22) PCT Filed: Dec. 18, 2013

(86) PCT No.: PCT/IB2013/061069
§ 371 (c)(1),
(2) Date: Jun. 12, 2015

(87) PCT Pub. No.: WO2014/097161
PCT Pub. Date: Jun. 26, 2014

(65) Prior Publication Data
US 2015/0328489 A1 Nov. 19, 2015

(30) Foreign Application Priority Data
Dec. 18, 2012 (IT) .............................. TO2012A1099

(51) Int. Cl.
*A62D 1/06* (2006.01)
*F25B 45/00* (2006.01)
(Continued)

(52) U.S. Cl.
CPC .............. *A62D 1/06* (2013.01); *A62D 1/0057* (2013.01); *A62D 1/0092* (2013.01);
(Continued)

(58) Field of Classification Search
None
See application file for complete search history.

(56) References Cited

U.S. PATENT DOCUMENTS 5,695,688 A 12/1997 Nimitz et al.
5,716,549 A * 2/1998 Nimitz ................ A62D 1/0057
252/2

(Continued)

FOREIGN PATENT DOCUMENTS

JP H08277389 A 10/1996
JP H09111230 A 4/1997
(Continued)

OTHER PUBLICATIONS

PCT International Search Report and the Written Opinion, Application No. PCT/IB2013/06169 filed Dec. 18, 2013, dated Apr. 11, 2014.

*Primary Examiner* — Joseph D Anthony
(74) *Attorney, Agent, or Firm* — MacMillan, Sobanski & Todd, LLC (57) ABSTRACT

Use of a gas mixture selected from the group comprising: —trifluoroiodomethane ($CF_3I$) in concentrations from 85% to 99% by weight and a gas selected from the group comprising fluoroethane, pentafluoroiodoethane, pentafluoroethane, dimethyl ether, propylene or their mixtures in concentrations from 15% to 1% by weight as refrigerant, propellant, foaming and/or extinguishing gases as replacements or alternatives for other gases or HFC (hydrofluorocarbon), HFO (hydrofluoro-olefin) and HFE (hydrofluoroether) mixtures.

13 Claims, 7 Drawing Sheets

Temperature (°C)

(51) Int. Cl.
    *B01F 17/00*     (2006.01)
    *C09K 5/04*     (2006.01)
    *C09K 3/30*     (2006.01)
    *C08J 9/14*     (2006.01)
    *A62D 1/00*     (2006.01)

(52) U.S. Cl.
CPC ........... *B01F 17/0085* (2013.01); *C08J 9/149* (2013.01); *C09K 3/30* (2013.01); *C09K 5/044* (2013.01); *C09K 5/045* (2013.01); *F25B 45/00* (2013.01); *C08J 2203/12* (2013.01); *C08J 2203/142* (2013.01); *C08J 2203/16* (2013.01); *C08J 2203/182* (2013.01); *C08J 2203/202* (2013.01); *C08J 2325/06* (2013.01); *C08J 2375/04* (2013.01); *C09K 2205/11* (2013.01); *C09K 2205/12* (2013.01); *C09K 2205/122* (2013.01); *C09K 2205/22* (2013.01); *C09K 2205/24* (2013.01); *C09K 2205/40* (2013.01)

(56) References Cited

U.S. PATENT DOCUMENTS

| | | | |
|---|---|---|---|
| 7,083,742 B1* | 8/2006 | Nimitz | A62D 1/0057 169/45 |
| 7,465,698 B2* | 12/2008 | Wilson | C08J 9/143 510/408 |
| 7,879,253 B2* | 2/2011 | Minor | A62D 1/0057 222/635 |
| 8,598,107 B2* | 12/2013 | Singh | A62D 1/00 252/67 |
| 2004/0021124 A1* | 2/2004 | Cho | C09K 5/042 252/2 |
| 2006/0043330 A1* | 3/2006 | Wilson | C09K 3/30 252/67 |
| 2006/0116310 A1 | 6/2006 | Singh et al. | |
| 2010/0176331 A1 | 7/2010 | Singh et al. | |
| 2010/0257881 A1* | 10/2010 | Perti | A61L 2/206 62/115 |
| 2011/0253927 A1* | 10/2011 | Minor | C08J 9/146 252/68 |
| 2014/0048737 A1* | 2/2014 | Singh | A62D 1/00 252/8 |

FOREIGN PATENT DOCUMENTS

| | | |
|---|---|---|
| JP | 2009001651 A | 1/2009 |
| JP | 2010116506 A | 5/2010 |
| KR | 20000075201 A | 12/2000 |
| WO | 00/39242 A1 | 7/2000 |
| WO | 2010/001430 | 1/2010 |

* cited by examiner

LOW ENVIRONMENTAL IMPACT REFRIGERANT GAS MIXTURES

This is a national stage application filed under 35 U.S.C. § 371 of international application PCT/IB2013/061069, filed under the authority of the Patent Cooperation Treaty on Dec. 18, 2013, published; which claims the benefit of Patent Application No. TO2012A001099, filed on Dec. 18, 2012. The entire disclosures of all the aforementioned applications are expressly incorporated herein by reference for all purposes.

This invention relates to gas mixtures which are useful as refrigerants, propellants, extinguishing and/or expanding agents as replacements or alternatives for R134a or gases containing HFC (hydrofluorocarbons), HFO (hydrofluoro-olefins) and HFE (hydrofluoroethers).

R134a (1,1,1,2-tetrafluoroethane) is a hydrofluorocarbon that has been used since the early 90s as a refrigerant gas as a substitute for chlorofluorocarbons or hydrochlorofluorocarbons having a significant ozone depletion potential (hereinafter ODP) which have been regulated following the Montreal Protocol.

Unlike chlorofluorocarbons and hydrochlorofluorocarbons, R134a has a non-significant ODP and has and is finding application in particular as a refrigerant in air-conditioning or refrigeration.

R134a nevertheless has a high global warming potential (hereinafter GWP) and subsequent to the Kyoto Protocol, European regulation has restricted it and is progressively restricting its availability and use in air conditioning or refrigeration systems.

The primary object of this invention is to provide refrigerating, propellant and/or expanding gas mixtures which can be used as a replacement or alternative for R134a and/or other gases as replacements or alternatives for R134a containing HFC (hydrofluorocarbons), HFO (hydrofluoro-olefins) and HFE (hydrofluoroethers), which have a lower production cost and better environmental impact properties, particularly in terms of GWP, than R134a together with thermodynamic properties which render them suitable for use as replacement refrigerant gases having improved characteristics for motor vehicle air-conditioning, domestic, commercial and industrial air-conditioning and refrigeration applications.

The invention is based on recognition of the fact that the abovementioned objects can be achieved using a gas mixture which comprises trifluoroiodomethane in combination with specific halogenated or non-halogenated hydrocarbons in specific relative concentrations of the mixture constituents.

Binary mixtures of hydrocarbons containing trifluoroiodomethane have already been proposed in the prior art as refrigerating gases—for example JP2009001651 refers to a refrigerating mixture of $CF_3I$ and HFC-152a, having compositions between 50% and 80% of trifluoroiodomethane.

JP2010116506 describes mixtures comprising $CF_3I$ and HFC-152a as components of a propellant mixture, in which trifluoroiodomethane may be present in concentrations from 66% to 77% by weight.

WO0039242 describes mixtures comprising $CF_3I$ in quantities from 10% to 60% by weight and R-161 in quantities from 40% to 90% by weight as refrigerants replacing R22 and R502.

In this respect this invention provides mixtures which, through specific selection of the concentration ranges of the halogenated hydrocarbons used, have a low GWP of in any event less than 150 and tend to have non-flammability aspects because R134a or HFC (hydrofluorocarbons), HFO (hydrofluoro-olefins) and FIFE (hydrofluoroethers) have been replaced.

The object of the invention comprises gas mixtures as defined in the appended claims and uses of the aforesaid mixtures in the applications defined in the claims.

One aspect of the invention relates to the use of a gas mixture comprising trifluoroiodomethane ($CF_3I$) in a concentration from 85% to 99% by weight and a gas selected from the group comprising fluoroethane, pentafluoroiodoethane, dimethyl ether, propylene or their mixtures in a concentration from 15% to 1% by weight as a refrigerant, propellant and/or expanding gas as a replacement or alternative for R134a and/or other refrigerants which are replacements or alternatives containing HFC (hydrofluorocarbons), HFO (hydrofluoro-olefins) and HFE (hydrofluoroethers) in air-conditioning or refrigeration systems, in particular in motor vehicle air conditioning systems designed for the use of R134a.

When used as a refrigerant the mixtures according to the invention find application in both newly manufactured systems and as retrofits for existing systems, requiring only the replacement of a few components as the mixtures according to the invention have been designed to have non-flammability properties similar to those of R134a.

In particular, the mixtures according to the invention find application in motor vehicle air-conditioning systems, refrigerated counters for supermarkets, cold stores, domestic refrigerators, centrifugal chillers, domestic, commercial and industrial air-conditioning systems, domestic, commercial and industrial chillers, air-conditioning or refrigeration plant in the processing industry, refrigerated transport, chilled water dispensers, commercial ice machines and domestic, commercial and industrial dehumidifiers.

Air-conditioning or refrigeration systems which use mixtures according to the invention as a refrigerant fall within the scope of the invention.

Refrigerant mixtures comprising trifluoroiodomethane ($CF_3I$) in a concentration from 85% to 99% by weight and a gas selected from the group comprising fluoroethane, pentafluoroiodoethane, dimethyl ether, propylene or their mixtures in a concentration from 15% to 1% by weight also constitute an object of the invention.

Within the concentration range of the gases comprising the mixtures the following mixtures are preferred as replacements or alternatives for R134a:

TABLE 1

| Fluids | Preferred composition range | Preferred R134a |
|---|---|---|
| trifluoroiodomethane | 85-95% | 85% |
| fluoroethane | 15-5% | 15% |
| trifluoroiodomethane | 90-95% | 90% |
| propylene | 10-5% | 10% |
| trifluoroiodomethane | 85-99% | 87% |
| dimethyl ether | 15-1% | 13% |
| trifluoroiodomethane | 90-99% | |
| pentafluoroiodomethane | 10-1% | |

The mixtures proposed in Table 1 have improved characteristics in comparison with the use of R134a in refrigeration cycles for medium and high temperature applications.

Another aspect of the invention relates to the use of a gas mixture selected from the group comprising trifluoroiodomethane ($CF_3I$) in a concentration from 85% to 99% by weight and a gas selected from the group comprising fluoroethane, pentafluoroiodoethane, dimethyl ether, propylene or their mixtures in a concentration from 15% to 1% by weight as a refrigerant and/or propellant gas as a replacement or alternative for other refrigerant and/or propellant gases containing HFC (hydrofluorocarbons), HFO (hydrofluoro-olefins) and HFE (hydrofluoroethers).

In particular, the mixtures according to the invention find application in motor vehicle air-conditioning systems, refrigerated counters for supermarkets, cold stores, domestic refrigerators, centrifugal chillers, domestic, commercial and industrial air-conditioning systems, domestic, commercial and industrial chillers, air-conditioning or refrigeration plant in the processing industry, refrigerated transport, chilled water dispensers, commercial ice machines and domestic, commercial and industrial dehumidifiers.

Air-conditioning or refrigeration systems which use mixtures according to the invention as a refrigerant fall within the scope of the invention.

Furthermore, mixtures according to the invention find application as propellants in pressure vessels, deodorants, foams, cosmetic and personal hygiene products, aerosols, compressed air guns and also in spray products in various fields such as: personal care, home care products, insecticides, paints, lubricants and technical products in general.

Within the concentration range of the gases comprising the mixtures the following mixture compositions are preferred:

TABLE 2

| Fluids | Composition range | Preferred |
|---|---|---|
| trifluoroiodomethane | 90-99% | 97.5% |
| fluoroethane | 10-1% | 2.5% |
| trifluoroiodomethane | 90-99% | 97.5% |
| propylene | 10-1% | 2.5% |
| trifluoroiodomethane | 90-99% | 95.0% |
| dimethyl ether | 10-1% | 5.0% |
| trifluoroiodomethane | 90-99% | 95.0% |
| pentafluoroiodoethane | 10-1% | 5.0% |

Appended table (Table 3) illustrates some salient characteristics relating to the thermodynamic properties of the mixtures according to the invention within the concentration ranges mentioned above, together with their salient environmental impact characteristics (GWP), in comparison with the corresponding properties of R134a, R1234ze and R1234yf.

TABLE 3

| Fluids | T Boiling point | Glide K | GWP |
|---|---|---|---|
| R134a | −26.3 | — | 1300 |
| R1234ze | −18.9 | — | 4 |
| R1234yf | −29.5 | — | 4 |
| CF$_3$I/fluoroethane | −35.8 to −24.6 | 3.4-1.9 | <2 |
| CF$_3$I/propylene | −39.9 to −24.5 | 6.8-1.8 | <3 |
| CF$_3$I/pentafluoroiodoethane | −19.2 to −21.7 | 4.1-0.2 | <2 |
| CF$_3$I/dimethyl ether | −27.3 to −22.9 | 0.1-0.5 | <3 |

As may be seen from Table 3 above, the mixtures used according to the invention have low glide values (difference between the boiling point and the dew point at a pressure of 1 atmosphere).

In comparison with R134a, the mixtures drastically reduce the GWP from 1300 to values which do not in any event exceed 27.

Another aspect of the invention relates to use of a gas mixture selected from the group comprising:

trifluoroiodomethane (CF$_3$I) in concentrations from 85% to 99% by weight and a gas selected from the group comprising fluoroethane, pentafluoroiodoethane, dimethyl ether, propylene or their mixtures in concentrations from 15% to 1% by weight as an expanding gas as a replacement or alternative for HFC (hydrofluorocarbons), HFO (hydrofluoro-olefins) and HFE (hydrofluoroethers)

trifluoroiodomethane (CF$_3$I) in concentrations from 85% to 99% by weight and a gas selected from the group comprising pentafluoroiodoethane, pentafluoroethane or their mixtures in concentrations from 15% to 1% by weight as extinguishing gases as a replacement or alternative for HFC (hydrofluorocarbons), HFO (hydrofluoro-olefins) and HFE (hydrofluoroethers).

In particular, the use as an expanding agent relates to the production of rigid insulating polyurethane foams, flexible polyurethane products and seals, polyurethane products in contact with human skin, polyurethane or phenolic or polystyrene insulating sheets or panels, expanded products for the lagging of cold stores, homes and automotive upholstery.

Figure 1:
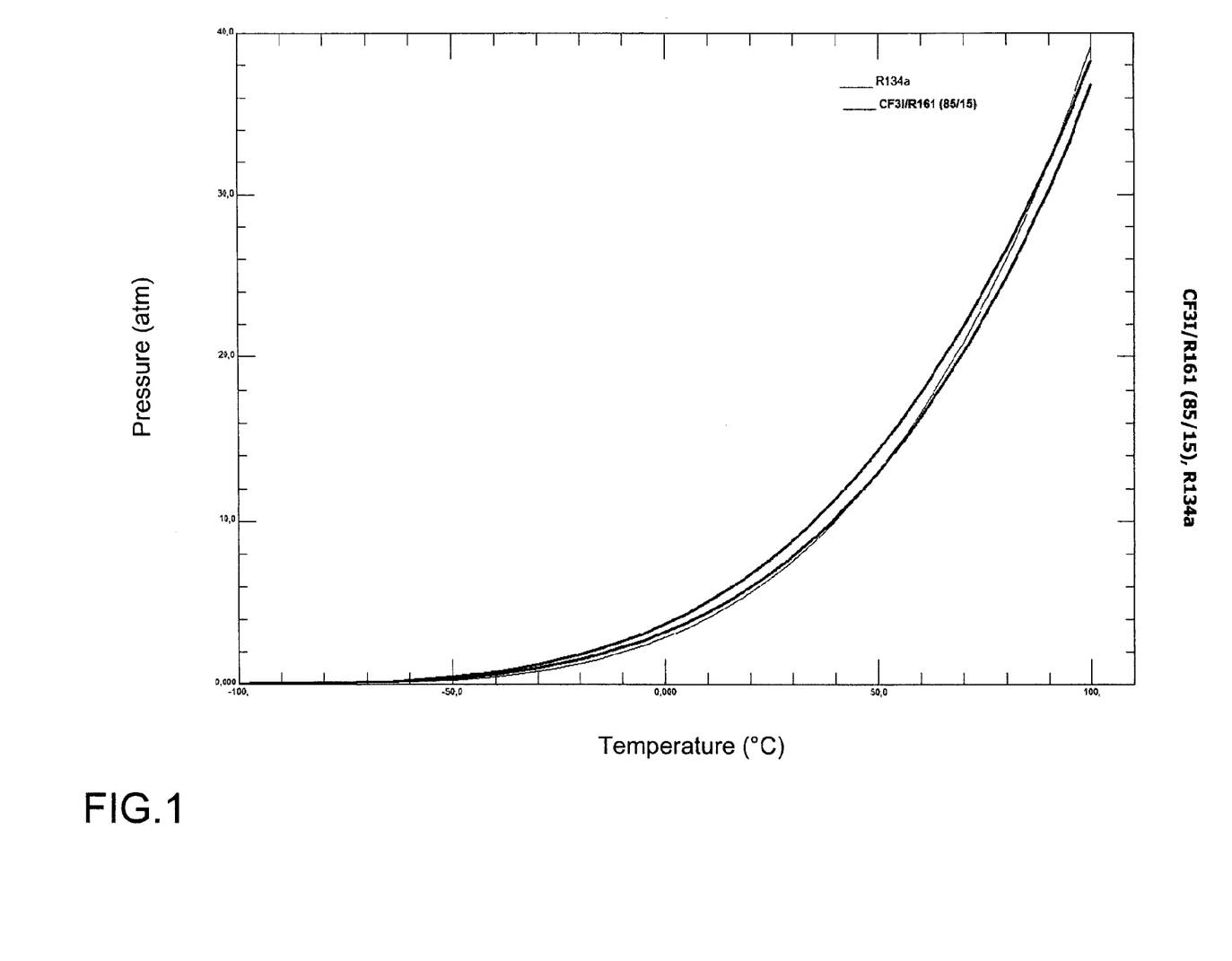
FIGS. 1 to 3 are diagrams illustrating pressure and temperature graphs for the preferred mixtures according to the invention in comparison with the corresponding graphs for R134a; the corresponding numerical values are shown in Tables 5 to 7.
Figure 2:
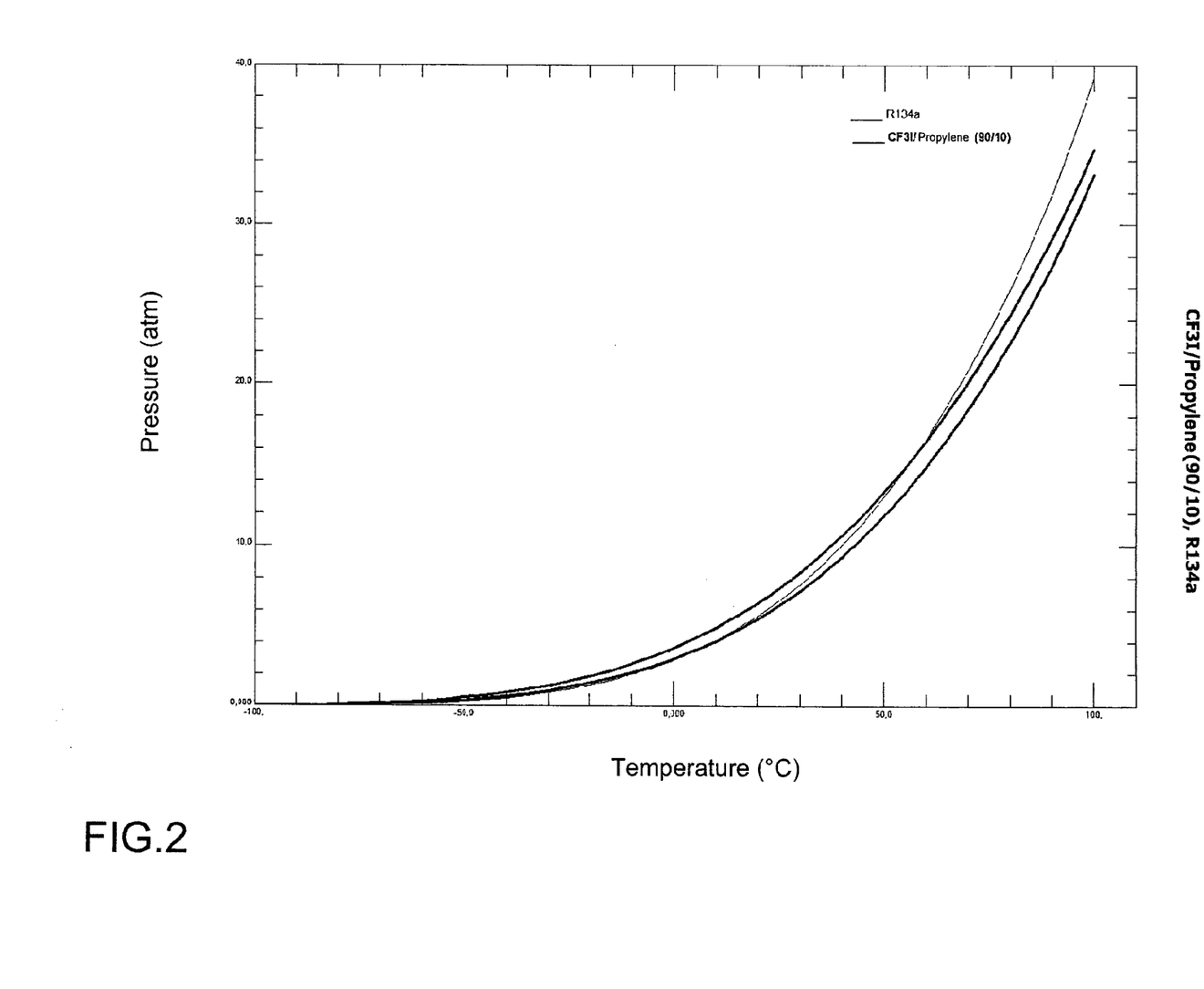
Figure 3:
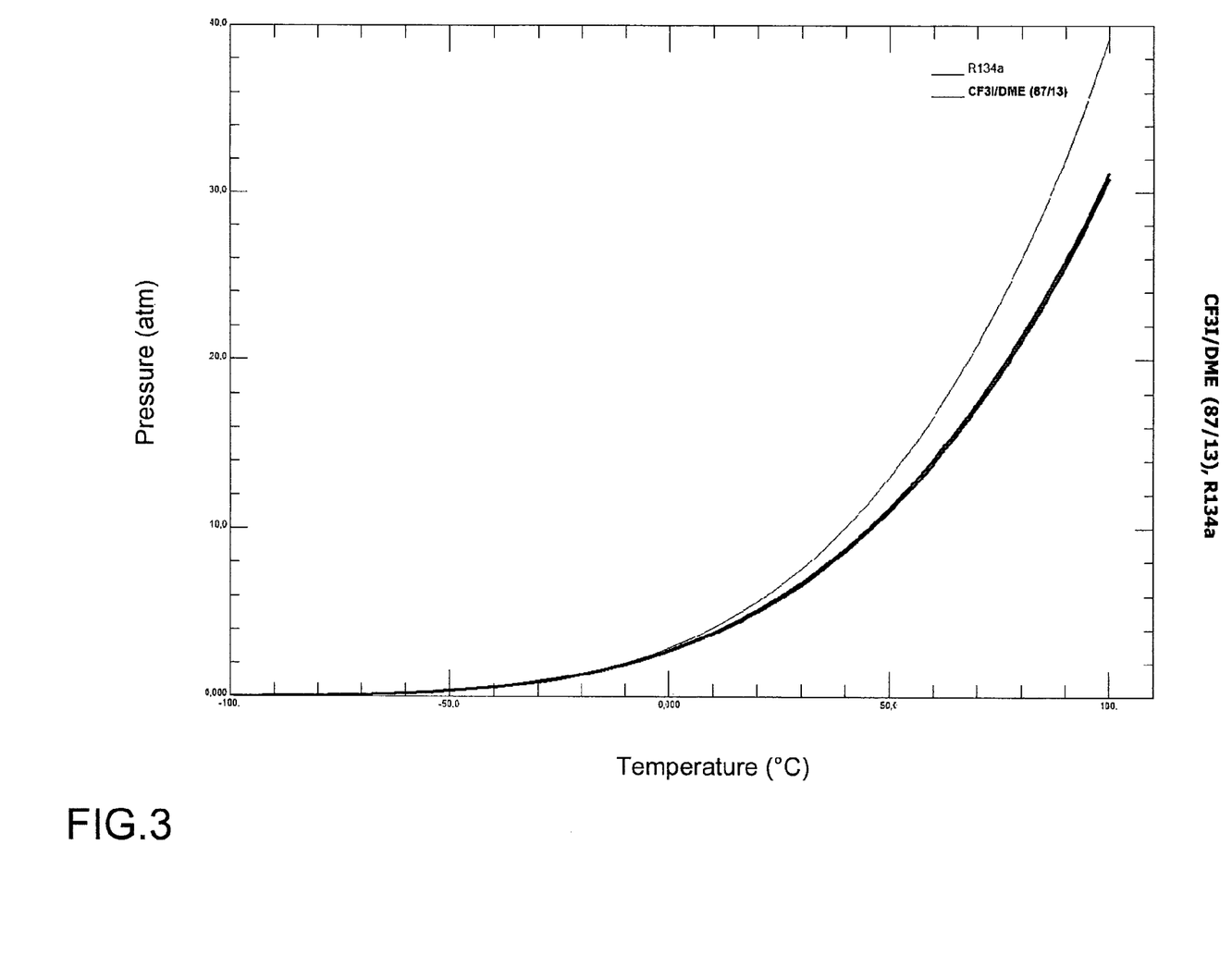
Figure 4:
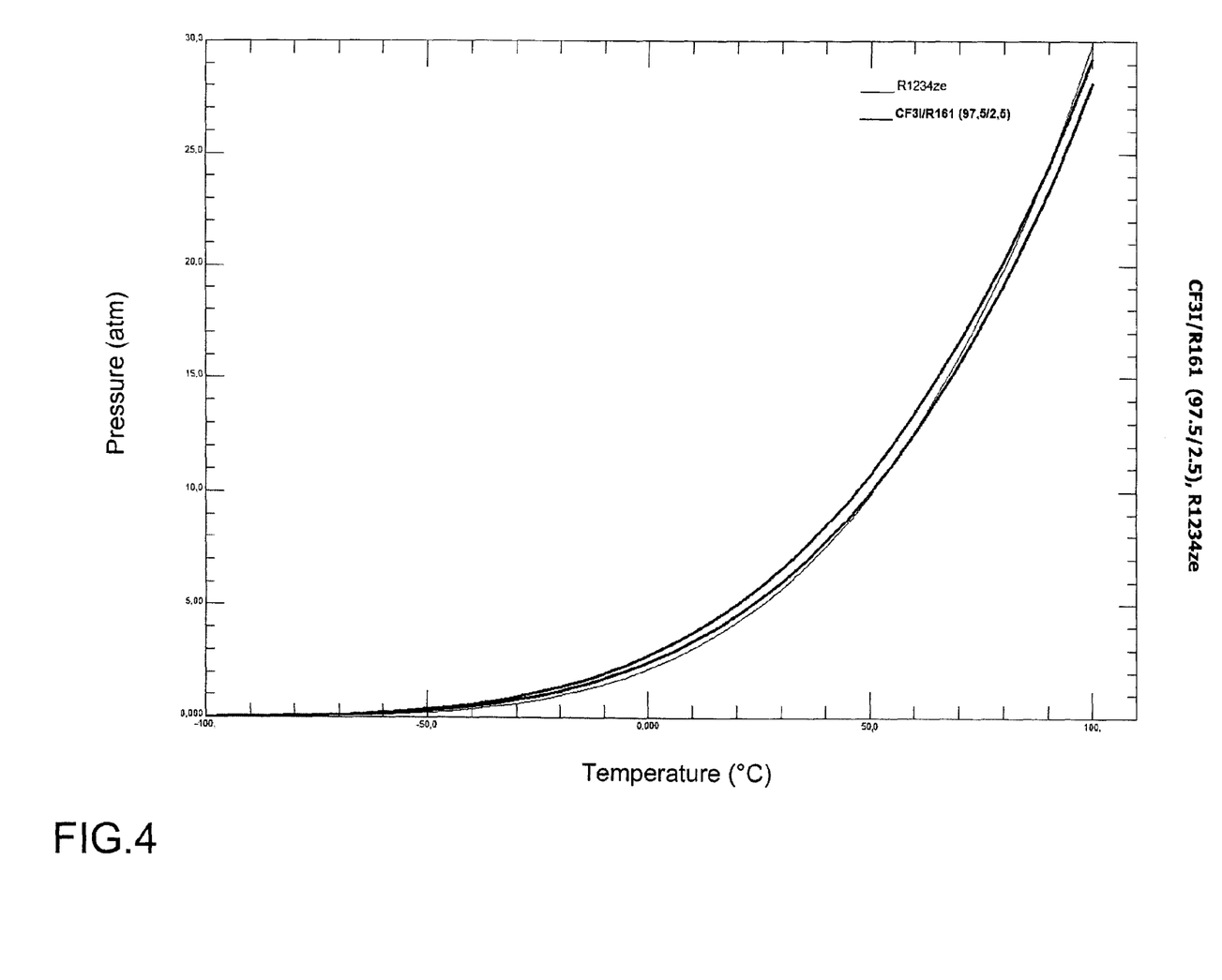
FIGS. 4 to 7 are diagrams illustrating pressure and temperature graphs for the preferred mixtures according to the invention in comparison with the corresponding graphs for R1234ze; the corresponding numerical values are shown in Tables 8 to 11.
Figure 5:
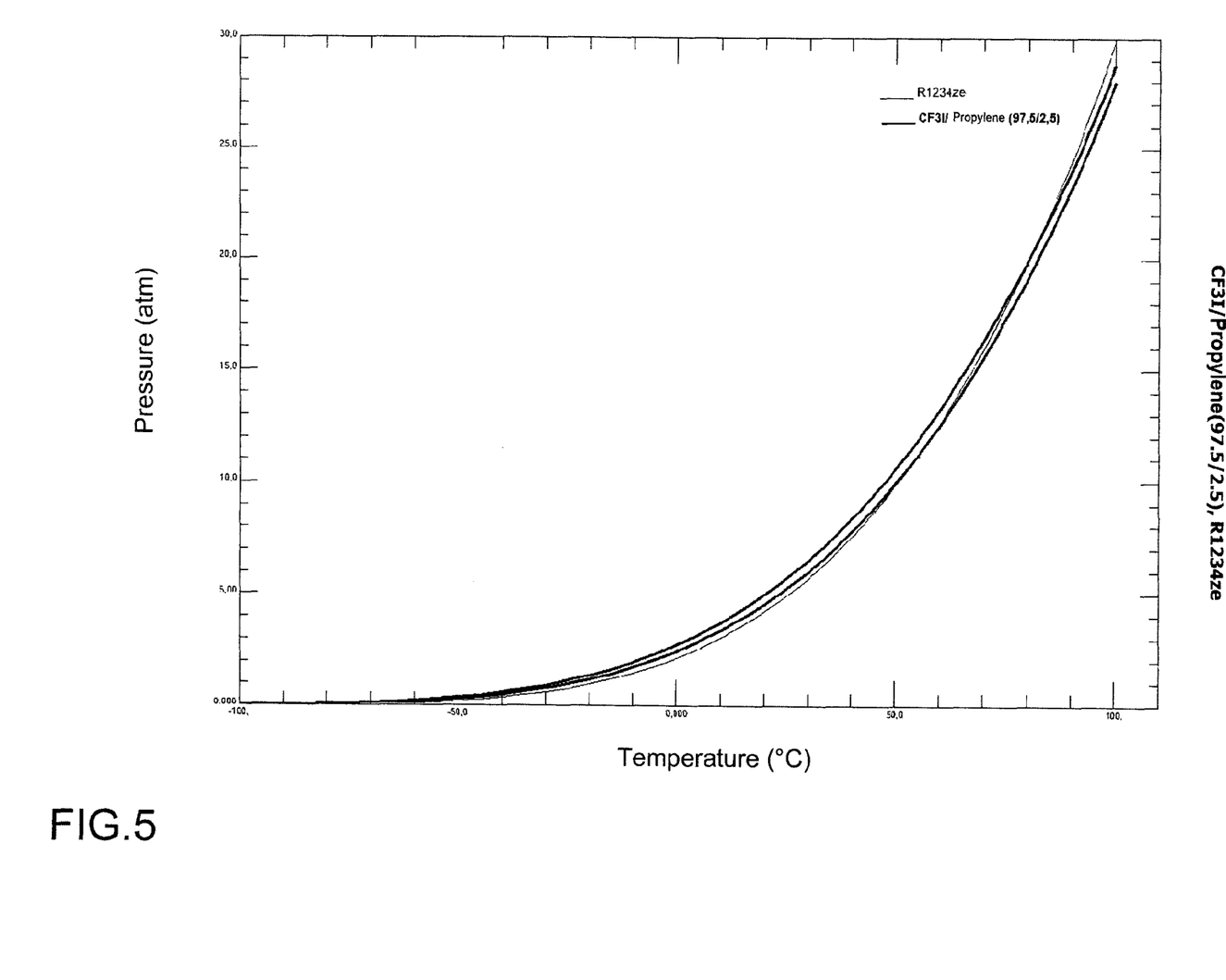
Figure 6:
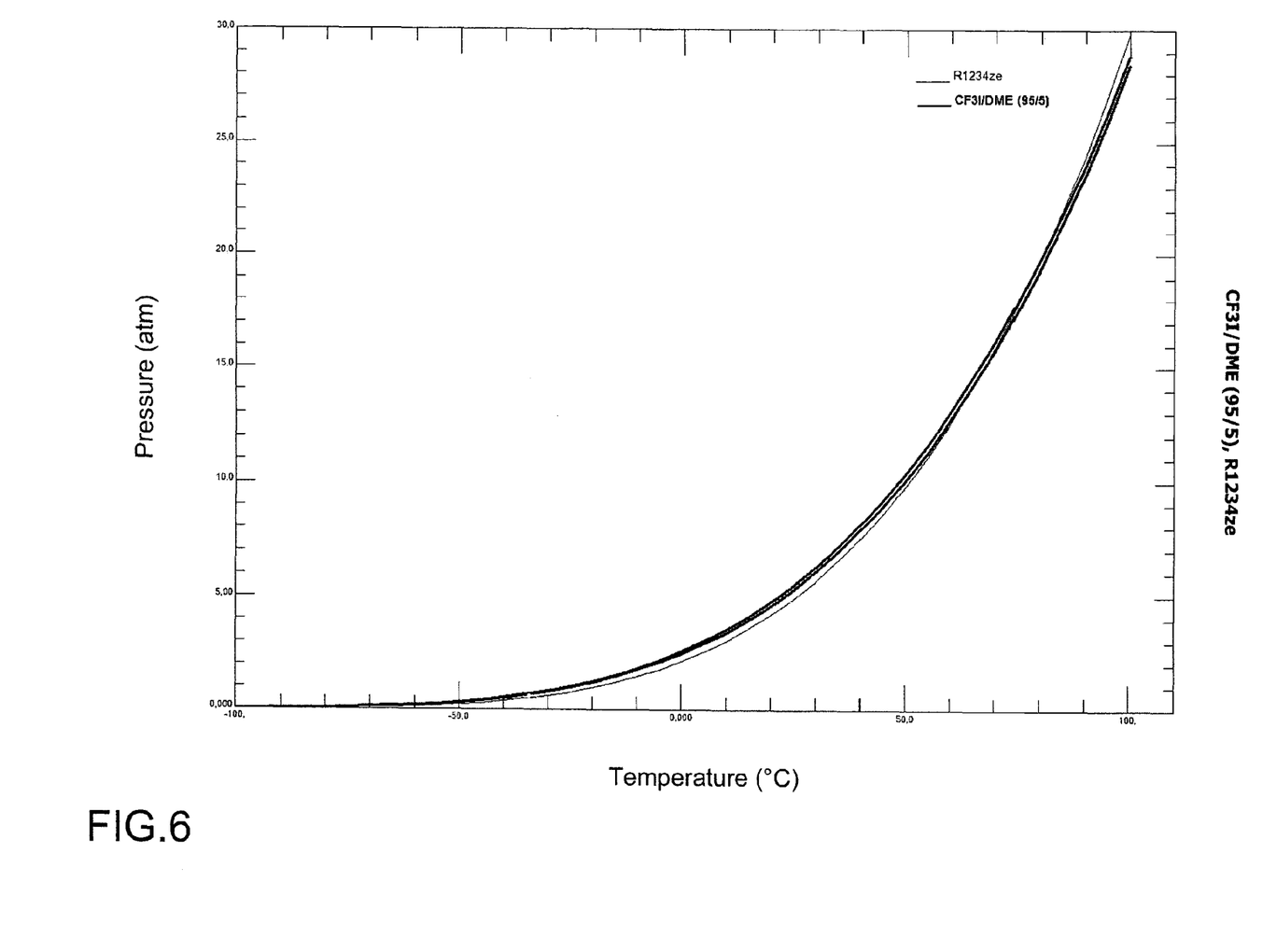
Figure 7:
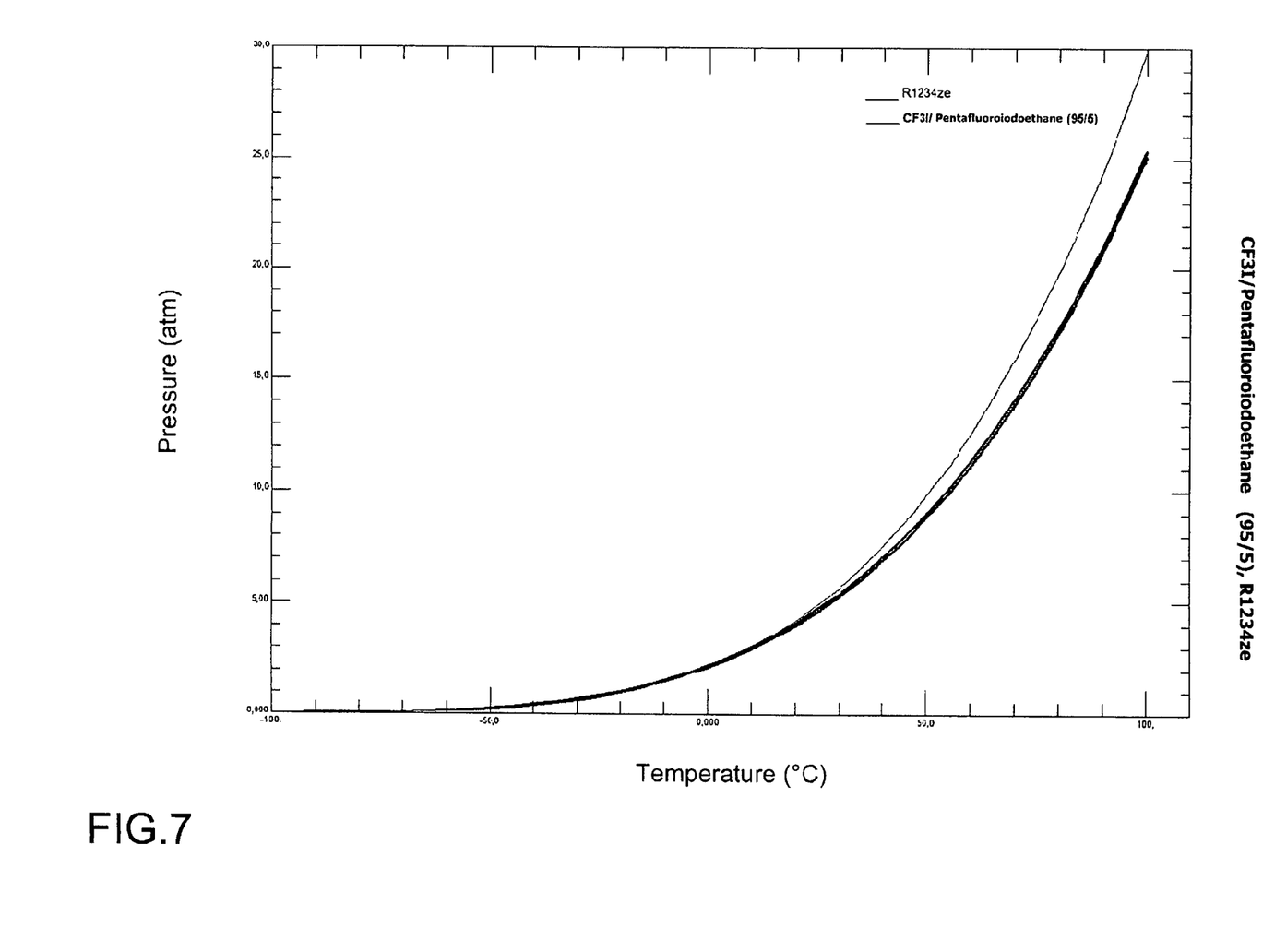

A comparison table between R134a, R1234ze, R1234yf and some replacements which are the subject of this invention is presented below.

TABLE 4

| % | Refrigerant | COPh | COPc |
|---|---|---|---|
| pure | R134a | 4.693 | 3.695 |
| pure | R1234ze | 4.688 | 3.690 |
| pure | R1234yf | 4.580 | 3.582 |
| 87/13 | CF$_3$I/DME | 4.746 | 3.748 |
| 85/15 | CF$_3$I/R161 | 4.513 | 3.515 |
| 90/10 | CF$_3$I/propylene | 4.457 | 3.459 |

The table describes the performance coefficients (COP) for specific mixtures which are the object of the invention, comparing these with R134a, R1234ze and R1234yf.

Performance coefficient values for heating (COPh) and cooling (COPc) are indicated in the table.

The values have been calculated for an air-conditioning system having a cooling potential of 17.5 thermal kW, 500 We of auxiliary power and supercooling of 5° C. The excess heat has been regarded as additional heat to the condenser.

The values indicated are the product of a mathematical simulation based on thermodynamic data known from the literature, making use of programs which are recognized internationally.

It will be seen that in all cases the COP for the proposed mixtures is wholly in line in comparison with R134a, R1234ze and R1234yf.

TABLE 5

CF$_3$I/R161 (85/15): P/T Table

| T °C. | P R134a atm | P$^L$ mix atm | P$^V$ mix atm |
|---|---|---|---|
| −100 | 0.006 | 0.017 | 0.012 |
| −95 | 0.009 | 0.026 | 0.019 |
| −90 | 0.015 | 0.039 | 0.029 |
| −85 | 0.024 | 0.057 | 0.044 |
| −80 | 0.036 | 0.082 | 0.063 |
| −75 | 0.054 | 0.116 | 0.090 |
| −70 | 0.079 | 0.160 | 0.126 |
| −65 | 0.112 | 0.217 | 0.172 |
| −60 | 0.157 | 0.290 | 0.232 |
| −55 | 0.215 | 0.381 | 0.307 |
| −50 | 0.291 | 0.495 | 0.401 |
| −45 | 0.386 | 0.634 | 0.517 |
| −40 | 0.505 | 0.802 | 0.659 |
| −35 | 0.653 | 1.003 | 0.830 |
| −30 | 0.833 | 1.242 | 1.035 |
| −25 | 1.050 | 1.523 | 1.277 |
| −20 | 1.310 | 1.850 | 1.561 |
| −15 | 1.618 | 2.230 | 1.893 |
| −10 | 1.980 | 2.666 | 2.276 |
| −5 | 2.402 | 3.163 | 2.716 |
| 0 | 2.890 | 3.728 | 3.219 |
| 5 | 3.451 | 4.366 | 3.789 |
| 10 | 4.092 | 5.081 | 4.434 |
| 15 | 4.820 | 5.880 | 5.157 |
| 20 | 5.642 | 6.768 | 5.966 |
| 25 | 6.567 | 7.752 | 6.867 |
| 30 | 7.601 | 8.837 | 7.866 |
| 35 | 8.754 | 10.028 | 8.970 |
| 40 | 10.033 | 11.333 | 10.186 |
| 45 | 11.448 | 12.757 | 11.520 |
| 50 | 13.007 | 14.307 | 12.980 |
| 55 | 14.720 | 15.989 | 14.575 |
| 60 | 16.598 | 17.810 | 16.312 |
| 65 | 18.651 | 19.776 | 18.201 |
| 70 | 20.891 | 21.896 | 20.252 |
| 75 | 23.332 | 24.177 | 22.476 |
| 80 | 25.988 | 26.626 | 24.886 |
| 85 | 28.876 | 29.253 | 27.498 |
| 90 | 32.018 | 32.066 | 30.332 |
| 95 | 35.443 | 35.074 | 33.417 |
| 100 | 39.204 | 38.283 | 36.799 |

TABLE 6

CF$_3$I/Propylene (90/10): P/T Table

| T °C. | P R134a atm | P$^L$ mix atm | P$^V$ mix atm |
|---|---|---|---|
| −100 | 0.006 | 0.021 | 0.011 |
| −95 | 0.009 | 0.032 | 0.018 |
| −90 | 0.015 | 0.048 | 0.027 |
| −85 | 0.024 | 0.068 | 0.040 |
| −80 | 0.036 | 0.096 | 0.058 |
| −75 | 0.054 | 0.133 | 0.083 |
| −70 | 0.079 | 0.181 | 0.115 |
| −65 | 0.112 | 0.241 | 0.158 |
| −60 | 0.157 | 0.317 | 0.212 |
| −55 | 0.215 | 0.411 | 0.281 |
| −50 | 0.291 | 0.527 | 0.368 |
| −45 | 0.386 | 0.666 | 0.474 |
| −40 | 0.505 | 0.833 | 0.604 |
| −35 | 0.653 | 1.031 | 0.761 |
| −30 | 0.833 | 1.264 | 0.948 |
| −25 | 1.050 | 1.536 | 1.170 |
| −20 | 1.310 | 1.850 | 1.430 |
| −15 | 1.618 | 2.212 | 1.734 |
| −10 | 1.980 | 2.625 | 2.084 |
| −5 | 2.402 | 3.094 | 2.487 |
| 0 | 2.890 | 3.624 | 2.947 |
| 5 | 3.451 | 4.218 | 3.468 |
| 10 | 4.092 | 4.883 | 4.057 |
| 15 | 4.820 | 5.622 | 4.718 |
| 20 | 5.642 | 6.440 | 5.456 |
| 25 | 6.567 | 7.344 | 6.278 |
| 30 | 7.601 | 8.337 | 7.189 |
| 35 | 8.754 | 9.424 | 8.195 |
| 40 | 10.033 | 10.612 | 9.302 |
| 45 | 11.448 | 11.905 | 10.516 |
| 50 | 13.007 | 13.308 | 11.843 |
| 55 | 14.720 | 14.828 | 13.290 |
| 60 | 16.598 | 16.469 | 14.865 |
| 65 | 18.651 | 18.238 | 16.575 |
| 70 | 20.891 | 20.140 | 18.428 |
| 75 | 23.332 | 22.182 | 20.432 |
| 80 | 25.988 | 24.370 | 22.598 |
| 85 | 28.876 | 26.711 | 24.937 |
| 90 | 32.018 | 29.211 | 27.461 |
| 95 | 35.443 | 31.877 | 30.189 |
| 100 | 39.204 | 34.717 | 33.143 |

TABLE 7

CF$_3$I/DME (87/13): P/T Table

| T °C. | P R134a atm | P$^L$ mix atm | P$^V$ mix atm |
|---|---|---|---|
| −100 | 0.006 | 0.010 | 0.010 |
| −95 | 0.009 | 0.015 | 0.015 |
| −90 | 0.015 | 0.024 | 0.023 |
| −85 | 0.024 | 0.035 | 0.035 |
| −80 | 0.036 | 0.051 | 0.051 |
| −75 | 0.054 | 0.074 | 0.073 |
| −70 | 0.079 | 0.103 | 0.102 |
| −65 | 0.112 | 0.142 | 0.140 |
| −60 | 0.157 | 0.192 | 0.189 |
| −55 | 0.215 | 0.255 | 0.251 |
| −50 | 0.291 | 0.335 | 0.330 |
| −45 | 0.386 | 0.434 | 0.426 |
| −40 | 0.505 | 0.554 | 0.545 |
| −35 | 0.653 | 0.701 | 0.688 |
| −30 | 0.833 | 0.876 | 0.859 |
| −25 | 1.050 | 1.083 | 1.062 |
| −20 | 1.310 | 1.328 | 1.302 |
| −15 | 1.618 | 1.613 | 1.581 |
| −10 | 1.980 | 1.943 | 1.905 |
| −5 | 2.402 | 2.323 | 2.277 |
| 0 | 2.890 | 2.757 | 2.702 |
| 5 | 3.451 | 3.251 | 3.186 |
| 10 | 4.092 | 3.808 | 3.733 |
| 15 | 4.820 | 4.435 | 4.347 |
| 20 | 5.642 | 5.135 | 5.035 |
| 25 | 6.567 | 5.915 | 5.801 |
| 30 | 7.601 | 6.780 | 6.651 |
| 35 | 8.754 | 7.735 | 7.591 |
| 40 | 10.033 | 8.786 | 8.625 |
| 45 | 11.448 | 9.938 | 9.760 |
| 50 | 13.007 | 11.198 | 11.002 |
| 55 | 14.720 | 12.571 | 12.357 |
| 60 | 16.598 | 14.063 | 13.831 |
| 65 | 18.651 | 15.681 | 15.431 |
| 70 | 20.891 | 17.432 | 17.164 |
| 75 | 23.332 | 19.323 | 19.037 |
| 80 | 25.988 | 21.360 | 21.059 |
| 85 | 28.876 | 23.552 | 23.238 |
| 90 | 32.018 | 25.908 | 25.584 |
| 95 | 35.443 | 28.436 | 28.108 |
| 100 | 39.204 | 31.149 | 30.823 |

TABLE 8

CF₃I/R161 (97.5/2.5): P/T Table

| T °C. | P R1234ze atm | P$^L$ mix atm | P$^V$ mix atm |
|---|---|---|---|
| −100 | 0.004 | 0.012 | 0.009 |
| −95 | 0.006 | 0.018 | 0.014 |
| −90 | 0.010 | 0.027 | 0.021 |
| −85 | 0.016 | 0.040 | 0.031 |
| −80 | 0.025 | 0.058 | 0.045 |
| −75 | 0.038 | 0.082 | 0.065 |
| −70 | 0.055 | 0.114 | 0.090 |
| −65 | 0.079 | 0.155 | 0.124 |
| −60 | 0.111 | 0.207 | 0.168 |
| −55 | 0.153 | 0.273 | 0.224 |
| −50 | 0.207 | 0.355 | 0.293 |
| −45 | 0.276 | 0.455 | 0.379 |
| −40 | 0.363 | 0.577 | 0.485 |
| −35 | 0.471 | 0.724 | 0.613 |
| −30 | 0.603 | 0.898 | 0.766 |
| −25 | 0.763 | 1.104 | 0.949 |
| −20 | 0.955 | 1.346 | 1.163 |
| −15 | 1.184 | 1.626 | 1.414 |
| −10 | 1.454 | 1.948 | 1.705 |
| −5 | 1.770 | 2.318 | 2.041 |
| 0 | 2.137 | 2.739 | 2.424 |
| 5 | 2.559 | 3.215 | 2.861 |
| 10 | 3.043 | 3.751 | 3.355 |
| 15 | 3.594 | 4.352 | 3.911 |
| 20 | 4.218 | 5.022 | 4.534 |
| 25 | 4.921 | 5.765 | 5.229 |
| 30 | 5.709 | 6.586 | 6.001 |
| 35 | 6.588 | 7.491 | 6.854 |
| 40 | 7.566 | 8.484 | 7.795 |
| 45 | 8.649 | 9.570 | 8.829 |
| 50 | 9.844 | 10.754 | 9.961 |
| 55 | 11.159 | 12.042 | 11.196 |
| 60 | 12.601 | 13.438 | 12.542 |
| 65 | 14.179 | 14.948 | 14.004 |
| 70 | 15.901 | 16.577 | 15.589 |
| 75 | 17.776 | 18.332 | 17.303 |
| 80 | 19.814 | 20.217 | 19.155 |
| 85 | 22.027 | 22.241 | 21.152 |
| 90 | 24.428 | 24.408 | 23.304 |
| 95 | 27.032 | 26.727 | 25.622 |
| 100 | 29.860 | 29.205 | 28.118 |

TABLE 9

CF₃I/Propylene (97.5/2.5): P/T Table

| T °C. | P R1234ze atm | P$^L$ mix atm | P$^V$ mix atm |
|---|---|---|---|
| −100 | 0.004 | 0.013 | 0.009 |
| −95 | 0.006 | 0.020 | 0.014 |
| −90 | 0.010 | 0.030 | 0.021 |
| −85 | 0.016 | 0.043 | 0.031 |
| −80 | 0.025 | 0.061 | 0.046 |
| −75 | 0.038 | 0.086 | 0.065 |
| −70 | 0.055 | 0.118 | 0.091 |
| −65 | 0.079 | 0.160 | 0.125 |
| −60 | 0.111 | 0.213 | 0.169 |
| −55 | 0.153 | 0.279 | 0.225 |
| −50 | 0.207 | 0.361 | 0.295 |
| −45 | 0.276 | 0.462 | 0.382 |
| −40 | 0.363 | 0.584 | 0.488 |
| −35 | 0.471 | 0.730 | 0.617 |
| −30 | 0.603 | 0.903 | 0.771 |
| −25 | 0.763 | 1.107 | 0.954 |
| −20 | 0.955 | 1.346 | 1.169 |
| −15 | 1.184 | 1.623 | 1.421 |
| −10 | 1.454 | 1.941 | 1.713 |
| −5 | 1.770 | 2.305 | 2.049 |
| 0 | 2.137 | 2.720 | 2.433 |
| 5 | 2.559 | 3.189 | 2.870 |
| 10 | 3.043 | 3.716 | 3.364 |
| 15 | 3.594 | 4.306 | 3.920 |
| 20 | 4.218 | 4.964 | 4.543 |
| 25 | 4.921 | 5.694 | 5.237 |
| 30 | 5.709 | 6.501 | 6.007 |
| 35 | 6.588 | 7.389 | 6.859 |
| 40 | 7.566 | 8.364 | 7.798 |
| 45 | 8.649 | 9.431 | 8.828 |
| 50 | 9.844 | 10.594 | 9.956 |
| 55 | 11.159 | 11.858 | 11.186 |
| 60 | 12.601 | 13.230 | 12.525 |
| 65 | 14.179 | 14.714 | 13.980 |
| 70 | 15.901 | 16.316 | 15.555 |
| 75 | 17.776 | 18.042 | 17.257 |
| 80 | 19.814 | 19.897 | 19.095 |
| 85 | 22.027 | 21.889 | 21.075 |
| 90 | 24.428 | 24.024 | 23.206 |
| 95 | 27.032 | 26.309 | 25.499 |
| 100 | 29.860 | 28.754 | 27.964 |

TABLE 10

CF₃I/DME (95/5): P/T Table

| T °C. | P R1234ze atm | P$^L$ mix atm | P$^V$ mix atm |
|---|---|---|---|
| −100 | 0.004 | 0.009 | 0.009 |
| −95 | 0.006 | 0.015 | 0.014 |
| −90 | 0.010 | 0.022 | 0.021 |
| −85 | 0.016 | 0.033 | 0.032 |
| −80 | 0.025 | 0.049 | 0.046 |
| −75 | 0.038 | 0.070 | 0.066 |
| −70 | 0.055 | 0.097 | 0.093 |
| −65 | 0.079 | 0.134 | 0.127 |
| −60 | 0.111 | 0.181 | 0.172 |
| −55 | 0.153 | 0.240 | 0.229 |
| −50 | 0.207 | 0.315 | 0.300 |
| −45 | 0.276 | 0.407 | 0.388 |
| −40 | 0.363 | 0.519 | 0.496 |
| −35 | 0.471 | 0.655 | 0.626 |
| −30 | 0.603 | 0.818 | 0.783 |
| −25 | 0.763 | 1.012 | 0.969 |
| −20 | 0.955 | 1.239 | 1.187 |
| −15 | 1.184 | 1.504 | 1.443 |
| −10 | 1.454 | 1.811 | 1.739 |
| −5 | 1.770 | 2.165 | 2.081 |
| 0 | 2.137 | 2.568 | 2.471 |
| 5 | 2.559 | 3.026 | 2.915 |
| 10 | 3.043 | 3.544 | 3.417 |
| 15 | 3.594 | 4.125 | 3.982 |
| 20 | 4.218 | 4.776 | 4.615 |
| 25 | 4.921 | 5.500 | 5.320 |
| 30 | 5.709 | 6.302 | 6.103 |
| 35 | 6.588 | 7.188 | 6.969 |
| 40 | 7.566 | 8.163 | 7.922 |
| 45 | 8.649 | 9.232 | 8.969 |
| 50 | 9.844 | 10.400 | 10.115 |
| 55 | 11.159 | 11.672 | 11.365 |
| 60 | 12.601 | 13.056 | 12.726 |
| 65 | 14.179 | 14.555 | 14.204 |
| 70 | 15.901 | 16.176 | 15.804 |
| 75 | 17.776 | 17.926 | 17.535 |
| 80 | 19.814 | 19.811 | 19.402 |
| 85 | 22.027 | 21.837 | 21.414 |
| 90 | 24.428 | 24.013 | 23.580 |
| 95 | 27.032 | 26.347 | 25.908 |
| 100 | 29.860 | 28.847 | 28.411 |

TABLE 11

CF₃I/Pentafluoroiodoethane (95/5): P/T Table

| T °C. | P R1234ze atm | P$^L$ mix atm | P$^V$ mix atm |
|---|---|---|---|
| −100 | 0.004 | 0.008 | 0.007 |
| −95 | 0.006 | 0.012 | 0.011 |
| −90 | 0.010 | 0.019 | 0.017 |
| −85 | 0.016 | 0.028 | 0.025 |
| −80 | 0.025 | 0.040 | 0.037 |
| −75 | 0.038 | 0.058 | 0.053 |
| −70 | 0.055 | 0.081 | 0.074 |
| −65 | 0.079 | 0.111 | 0.103 |
| −60 | 0.111 | 0.151 | 0.140 |
| −55 | 0.153 | 0.201 | 0.188 |
| −50 | 0.207 | 0.263 | 0.248 |
| −45 | 0.276 | 0.341 | 0.322 |
| −40 | 0.363 | 0.436 | 0.414 |
| −35 | 0.471 | 0.552 | 0.525 |
| −30 | 0.603 | 0.691 | 0.659 |
| −25 | 0.763 | 0.856 | 0.818 |
| −20 | 0.955 | 1.050 | 1.007 |
| −15 | 1.184 | 1.277 | 1.228 |
| −10 | 1.454 | 1.541 | 1.484 |
| −5 | 1.770 | 1.845 | 1.781 |
| 0 | 2.137 | 2.193 | 2.121 |
| 5 | 2.559 | 2.590 | 2.508 |
| 10 | 3.043 | 3.038 | 2.948 |
| 15 | 3.594 | 3.543 | 3.443 |
| 20 | 4.218 | 4.109 | 3.999 |
| 25 | 4.921 | 4.740 | 4.619 |
| 30 | 5.709 | 5.441 | 5.309 |
| 35 | 6.588 | 6.216 | 6.073 |
| 40 | 7.566 | 7.070 | 6.916 |
| 45 | 8.649 | 8.008 | 7.842 |
| 50 | 9.844 | 9.034 | 8.857 |
| 55 | 11.159 | 10.154 | 9.966 |
| 60 | 12.601 | 11.373 | 11.174 |
| 65 | 14.179 | 12.696 | 12.486 |
| 70 | 15.901 | 14.128 | 13.909 |
| 75 | 17.776 | 15.675 | 15.447 |
| 80 | 19.814 | 17.343 | 17.106 |
| 85 | 22.027 | 19.137 | 18.895 |
| 90 | 24.428 | 21.066 | 20.819 |
| 95 | 27.032 | 23.134 | 22.886 |
| 100 | 29.860 | 25.352 | 25.105 |

The invention claimed is:

1. A method comprising: providing a gas mixture as a refrigerant, propellant gas, expanding or extinguishing agent, the gas mixture selected from the group consisting of:
trifluoroiodomethane (CF3I) in a concentration from 85% to 99% by weight and fluoroethane (R161) in a concentration from 15% to 1% by weight, and
trifluoroiodomethane (CF3I) in a concentration from 90% to 99% by weight and a gas selected from the group consisting of propylene, pentafluoroiodoethane, pentafluoroethane and mixtures thereof in a concentration from 10% to 1% by weight,
the concentrations relating to the total weight of the gas mixture.

2. The method according to claim 1, the gas mixture selected from the group:
from 85 to 95% by weight of trifluoroiodomethane and from 15% to 5% by weight of fluoroethane, or 85% by weight of trifluoroiodomethane and 15% by weight of fluoroethane; and,
from 90 to 95% by weight of trifluoroiodomethane and from 10 to 5% by weight of propylene, or 90% by weight of trifluoroiodomethane and 10% by weight of propylene.

3. The method according to claim 1, the gas mixture selected from the group:
from 90 to 99% by weight of trifluoroiodomethane and from 10 to 1% by weight of fluoroethane, or 97.5% by weight of trifluoroiodomethane and 2.5% by weight of fluoroethane;
and
from 90% to 99% by weight of trifluoroiodomethane and from 10 to 1% by weight of propylene, or 97.5% by weight of trifluoroiodomethane and 2.5% by weight of propylene.

4. The method according to claim 1, wherein the gas mixture is used as a replacement or alternative for fluids containing HFCs (hydrofluorocarbons), HFO (hydrofluoro-olefins) and HFE (hydrofluoroethers).

5. The method according to claim 4, in which the said gas mixture is used in air conditioning systems of motor vehicles, refrigerated counters for supermarkets, cold stores, domestic refrigerators, centrifugal chillers, domestic, commercial and industrial air conditioning systems, domestic, commercial and industrial chillers, air conditioning and refrigeration plant in the process industry, refrigerated transport, chilled water dispensers, commercial ice machines and domestic, commercial and industrial dehumidifiers.

6. The method according to claim 4, in which the said gas mixture is used as propellant in pressurised containers, deodorants, cosmetic and personal hygiene products, in machines for aerosols, in compressed air guns, or in spray products in different fields such as personal care, home care, insecticides, paints, lubricants and technical products.

7. The method according to claim 1, wherein the gas mixture is used as a foaming and/or expanding gas, as a replacement or alternative for HFCs (hydrofluorocarbons), HFO (hydrofluoro-olefins) and HFE (hydrofluoroethers).

8. The method according to claim 7 in which the said gas mixture is used as an expanding agent for the production of rigid insulating polyurethane foam, flexible polyurethane products and seals, polyurethane products in contact with human skin, polyurethane or phenolic or polystyrene sheets and insulating panels, expanded products for the insulation of cold stores, homes, automotive upholstery.

9. The method according to claim 1, in which the gas mixture is used as an extinguishing gas, as a replacement or alternative for HFC (hydrofluorocarbons), HFO (hydro-fluoro-olefins) and HFE (hydrofluoroethers).

10. The method according to claim 9 in which the said gas mixture is used as an automatically discharged fire-fighting agent in unoccupied and non-residential confined areas.

11. The method according to claim 9 in which the said gas mixture is used as a fire-fighting agent in portable fire extinguishers other than in a residential environment.

12. The method according to claim 1, wherein the gas mixture is used in air-conditioning systems for motor vehicles, refrigerated counters for supermarkets, cold stores, home refrigerators, centrifugal chillers, domestic, commercial and industrial air conditioning, domestic, commercial and industrial chillers, air-conditioning and refrigeration plant in the process industry, refrigerated transport, chilled water dispensers, commercial ice machines and domestic, commercial and industrial dehumidifiers.

13. The method of claim 1, wherein the method comprises replacing refrigerant gas used in conditioning or refrigeration systems with the gas mixture.

* * * * *